United States Patent
Oishi et al.

(10) Patent No.: US 10,388,919 B2
(45) Date of Patent: Aug. 20, 2019

(54) BATTERY PACK HAVING LID WITH RELEASING PORTION

(71) Applicant: KABUSHIKI KAISHA TOYOTA JIDOSHOKKI, Aichi-ken (JP)

(72) Inventors: Hidefumi Oishi, Kariya (JP); Takayuki Kato, Kariya (JP); Fumihiko Ishiguro, Kariya (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 234 days.

(21) Appl. No.: 15/104,778

(22) PCT Filed: Dec. 11, 2014

(86) PCT No.: PCT/JP2014/082877
§ 371 (c)(1),
(2) Date: Jun. 15, 2016

(87) PCT Pub. No.: WO2015/098552
PCT Pub. Date: Jul. 2, 2015

(65) Prior Publication Data
US 2016/0322613 A1 Nov. 3, 2016

(30) Foreign Application Priority Data
Dec. 26, 2013 (JP) .................... 2013-270529

(51) Int. Cl.
*H01M 2/04* (2006.01)
*H01M 2/08* (2006.01)
(Continued)

(52) U.S. Cl.
CPC ............... *H01M 2/04* (2013.01); *H01M 2/08* (2013.01); *H01M 2/1077* (2013.01); *H01M 2/1229* (2013.01); *H01M 2220/20* (2013.01)

(58) Field of Classification Search
None
See application file for complete search history.

(56) References Cited

U.S. PATENT DOCUMENTS 2,516,084 A * 7/1950 Wells .................. H01M 2/1229
137/845

FOREIGN PATENT DOCUMENTS

JP 2011-198570 10/2011
JP 2013-89375 5/2013
JP 2013089375 A * 5/2013

OTHER PUBLICATIONS

International Search Report for PCT/JP2014/082877 dated Jan. 20, 2015.
(Continued)

*Primary Examiner* — Barbara L Gilliam
*Assistant Examiner* — Zhongqing Wei
(74) *Attorney, Agent, or Firm* — Greenblum & Bernstein, P.L.C.

(57) ABSTRACT

A battery pack has a sealed case. Battery modules are accommodated in the sealed case. An opening in the main body is closed by a rectangular plate-shaped lid member. The lid member has a releasing portion and a joint portion. When the internal pressure of the sealed case increases, the lid member is deformed away from an opening edge of the opening. This discharges gas from the sealed case through the releasing portion. In addition, the joint between the joint portion and the opening edge is maintained even when the internal pressure of the sealed case increases, deforming the releasing portion, and the gas inside the sealed case starts to be discharged. A protrusion of a rib is provided between the releasing portion and the joint portion.

6 Claims, 5 Drawing Sheets

(51) Int. Cl.
H01M 2/12 (2006.01)
H01M 2/10 (2006.01)

(56) References Cited

OTHER PUBLICATIONS

Written Opinion of the International Searching Authority for PCT/JP2014/082877 dated Jan. 20, 2015.
International Preliminary Report on Patentability for PCT/JP2014/082877 dated Jun. 28, 2016.

* cited by examiner

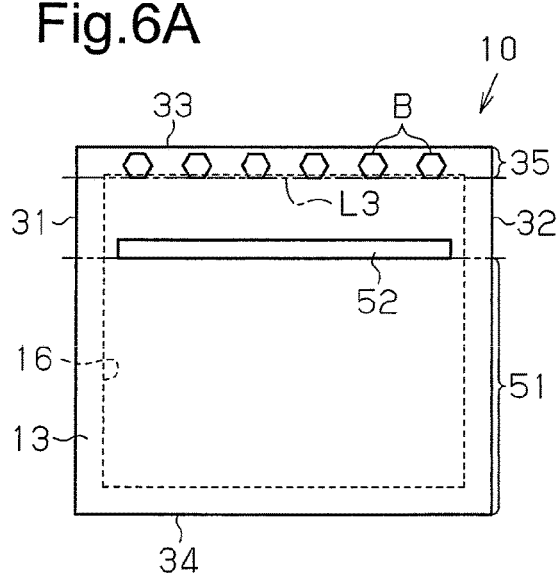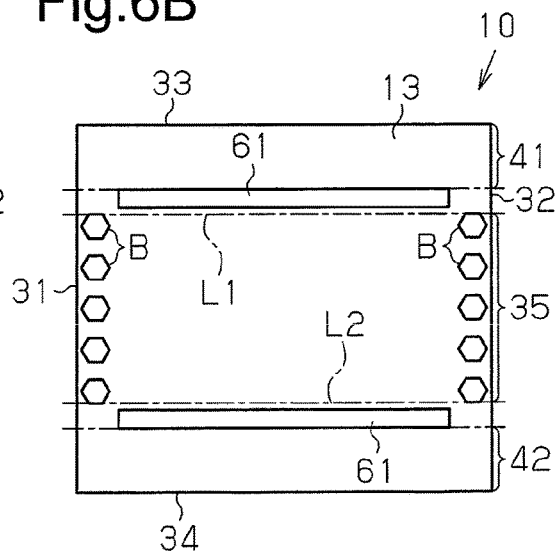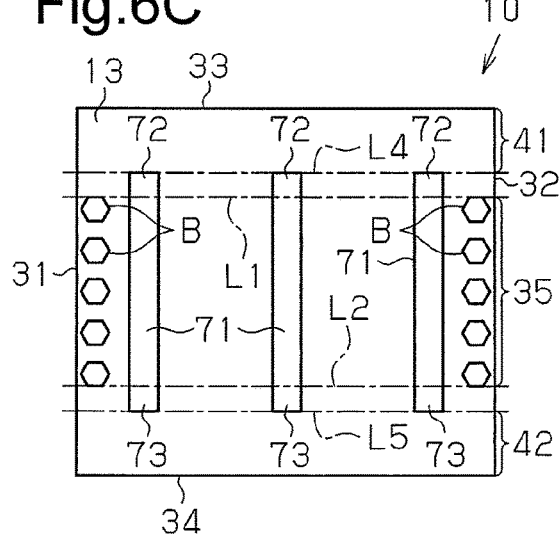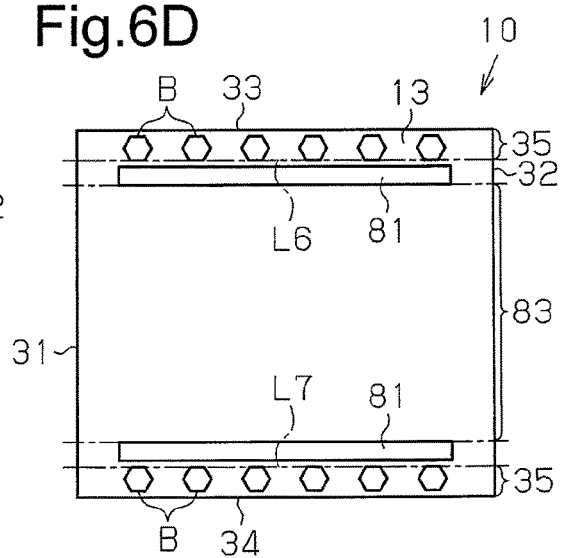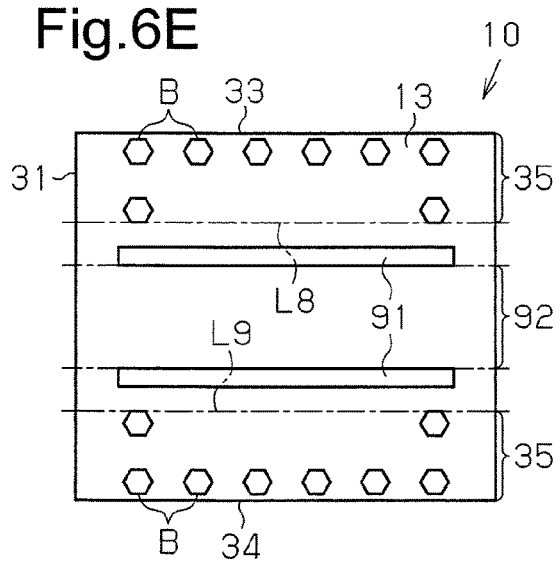

ically, the deformation of the sealing plate 102 concentrates stress on the fastening members 103. This can cause the fastening members 103 to come off the battery case so that the sealing plate 102 may come off the battery case.

BATTERY PACK HAVING LID WITH RELEASING PORTION

TECHNICAL FIELD

The present invention relates to a battery pack.

BACKGROUND ART

Patent Document 1 discloses a battery pack that is configured to accommodate battery cells in a sealed case. The battery pack is configured to release the internal pressure of the sealed case.

FIG. 7 illustrates the battery case disclosed in Patent Document 1. The battery case has an opening 101, which is sealed by a sealing plate 102. The sealing plate 102 is fixed to the battery case with fastening members 103. In this configuration, when there is an abnormality in any of the batteries in the battery case and that battery discharges gas, the internal pressure of the battery case increases. This deforms the sealing plate 102 away from the battery case. Then, a clearance is formed between the sealing plate 102 and the battery case, and the gas discharged by the battery is discharged to the outside of the battery case through the clearance. This releases the internal pressure of the battery case.

However, if the deformation of the sealing plate 102 reaches the part that is fixed to the battery case with the fastening members 103, the following drawbacks are caused. That is, the deformation of the sealing plate 102 concentrates stress on the fastening members 103. This can cause the fastening members 103 to come off the battery case so that the sealing plate 102 may come off the battery case.

PRIOR ART DOCUMENT

Patent Document

Patent Document 1: Japanese Laid-Open Patent Publication No. 2011-198570

SUMMARY OF THE INVENTION

Problems that the Invention is to Solve

Accordingly, it is an objective of the present invention to provide a battery pack that restrains a lid member from falling off when the lid member is opened.

Means for Solving the Problems

To achieve the foregoing objective and in accordance with a first aspect of the present invention, a battery pack that includes a sealed case and a battery cell is provided. The sealed case includes a main body having an opening, and a lid member, which is provided at an opening edge defining the opening and closes the opening. The battery cell is accommodated in the sealed case. The lid member has a releasing portion and a joint portion. When an internal pressure of the sealed case increases, the lid member is deformed away from the opening edge so that gas is discharged from the sealed case through the releasing portion. Even when the internal pressure of the sealed case increases and the releasing portion is deformed to start discharging the gas from the sealed case, joint between the joint portion and the opening edge is maintained by a joint member. A reinforcing portion, which reinforces the lid member, is provided between the releasing portion and the joint portion.

With this configuration, when the internal pressure of the sealed case increases, a clearance is formed between the releasing portion of the lid member and the main body. The gas is discharged from the sealed case through the clearance to release the internal pressure of the sealed case. The reinforcing portion is provided between the releasing portion and the joint portion. In this case, deformation of the releasing portion is restrained by the reinforcing portion and is thus unlikely to reach the joint portion. This restrains concentration of stress on the joint member due to deformation of the releasing portion. Therefore, when opened, the lid member is unlikely to come off the main body.

In the above described battery pack, the lid member is preferably joined to the sealed case with a bolt.

With this configuration, load is unlikely to be concentrated on the joint portion, that is, on the bolt. Damage to the bolt is thus restrained.

To achieve the foregoing objective and in accordance with a second aspect of the present invention, a battery pack that includes a sealed case and a battery cell is provided. The sealed case includes a main body having an opening, and a lid member, which closes the opening. The battery cell is accommodated in the sealed case. The lid member includes a joint portion, which is joined to the main body with a joint member, and a releasing portion, wherein a joint strength of the releasing portion to the main body is smaller than a joint strength at the joint portion. A reinforcing portion, which reinforces the lid member, is provided between the joint member and the releasing portion.

BRIEF DESCRIPTION OF THE DRAWINGS

FIGS. 6A to 6E are front views showing battery packs according to modifications.

MODES FOR CARRYING OUT THE INVENTION

A battery pack according to one embodiment of the present invention will now be described with reference to FIGS. 1 to 6E.

Figure 1:
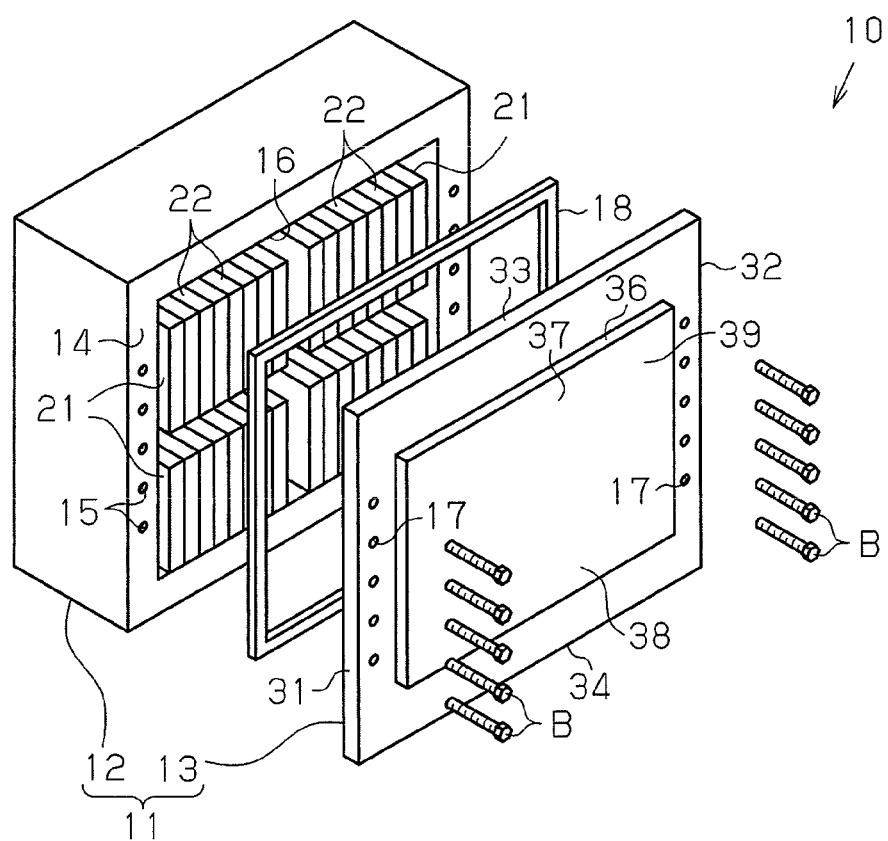
FIG. 1 is an exploded perspective view illustrating a battery pack according to one embodiment of the present invention.

As shown in FIG. 1, a battery pack 10 includes a sealed case 11. The sealed case 11 accommodates battery modules 21. Each battery module 21 includes battery cells 22. The sealed case 11 includes a main body 12 and a rectangular plate-shaped lid member 13. The main body 12 is shaped as a rectangular tube with a closed end has an opening 16. The lid member 13 is attached to an opening edge 14, which forms the opening 16 of the main body 12. The opening 16 is closed by the lid member 13. The lid member 13 is joined to the opening edge 14 of the main body 12 with bolts B, which function as joint members. The opening edge 14 has threaded holes 15, into which the bolts B are threaded. The lid member 13 has insertion holes 17, into which the bolts B are inserted. The bolts B are inserted into the insertion holes 17 and threaded into the threaded holes 15 to join the lid member 13 to the opening edge 14. A sealing member 18 is arranged between the opening edge 14 and the lid member 13. The lid member 13 has four ends 31 to 34. The first end 31 and the second end 32 are on opposite sides from each other. The third end 33 and the fourth end 34 are different from the first end 31 and the second end 32 and are on opposite sides from each other.

Figure 2:
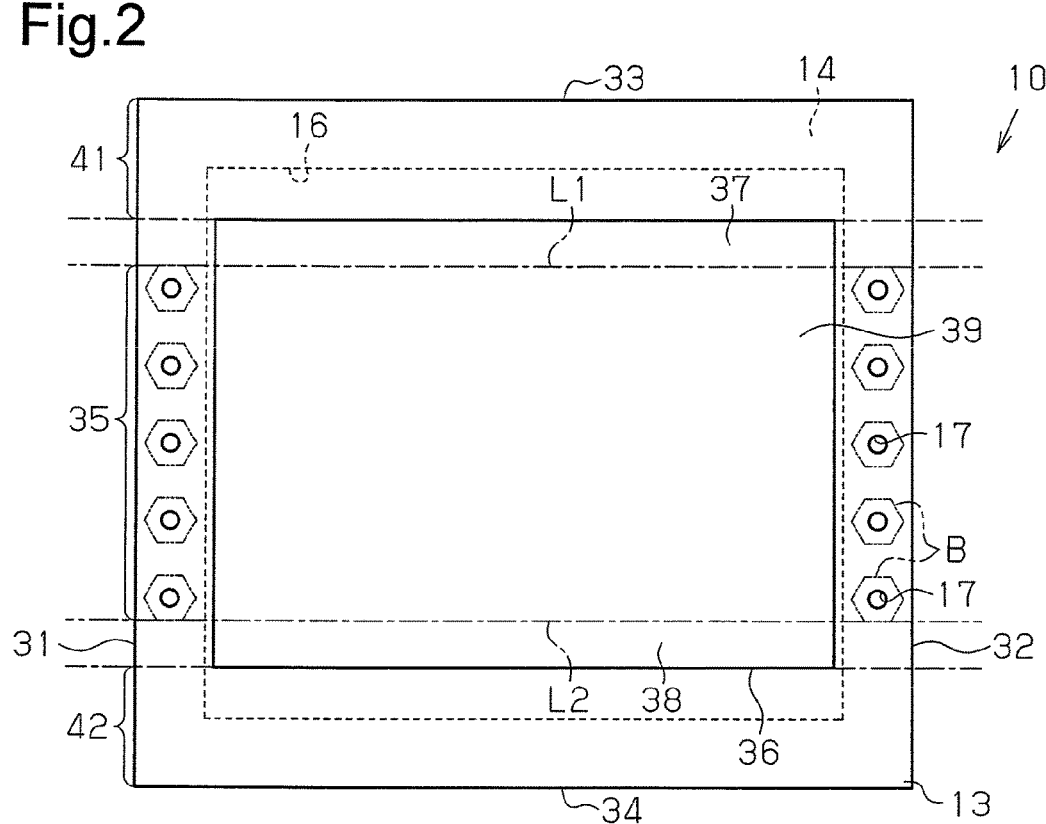
FIG. 2 is a front view showing the battery pack.

As shown in FIG. 2, the bolts B are inserted into the insertion holes 17 at the first end 31 and the insertion holes 17 at the second end 32. The insertion holes 17, into which the bolts B are inserted, are formed in parts of the first end 31 and the second end 32, but are not formed in the corners of the lid member 13. The bolts B are inserted into the insertion holes 17 while being arranged in a direction perpendicular to the third end 33 and the fourth end 34. No insertion holes 17 for receiving bolts B are formed at the third end 33 or the fourth end 34.

The bolts B at the first end 31 and the second end 32 are fastened by a predetermined fastening amount. The fastening amount of the bolts B is set to a value at which the joint between a part of the lid member 13 and the opening edge 14 is maintained even if the internal pressure of the sealed case 11 increases to a level at which a first releasing portion 41 and a second releasing portion 42, which will be discussed below, are deformed to start discharging gas from the sealed case 11. A joint portion is defined as a part of the lid member 13 that remains joined to the opening edge 14 with the bolts B even if the internal pressure of the sealed case 11 increases to a level at which the first releasing portion 41 and the second releasing portion 42 are deformed to start discharging gas from the sealed case 11.

A first imaginary line L1 shown in FIG. 2 connects one of the bolts B at the first end 31 that is closest to the third end 33 to one of the bolts B at the second end 32 that is closest to the third end 33. Specifically, the first imaginary line L1 connects the part of the bolt B at the first end 31 that is closest to the third end 33 to the part of the bolt B at the second end 32 that is closest to the third end 33. Also, a second imaginary line L2 shown in FIG. 2 connects one of the bolts B at the first end 31 that is closest to the fourth end 34 to one of the bolts B at the second end 32 that is closest to the fourth end 34. Specifically, the second imaginary line L2 connects the part of the bolt B at the first end 31 that is closest to the fourth end 34 to the part of the bolt B at the second end 32 that is closest to the fourth end 34. In this case, an area on the lid member 13 between the first imaginary line L1 and the second imaginary line L2 is a joint portion 35.

A rib 36, which functions as a reinforcing portion, is provided on the outer surface of the sealed case 11. The outer surface of the sealed case 11 intersects the thickness direction of the lid member 13. The rib 36 is shaped like a rectangular plate. The rib 36 is located at the center of the lid member 13 and between the bolts B at the first end 31 and the bolts B at the second end 32. The rib 36 includes a main body 39, which constitutes a part of the joint portion 35, a first protrusion 37, which protrudes from an end of the main body 39 toward the third end 33, and a second protrusion 38, which protrudes from an end of the main body 39 toward the fourth end 34. The main body 39 is a part of the joint portion 35 that is located between the bolts B at the first end 31 and the bolts B at the second end 32.

Therefore, when the internal pressure of the sealed case 11 increases, the third end 33 and the fourth end 34 of the lid member 13, which are not joined to the opening edge 14 with the bolts B, are deformed away from the opening edge 14. At this time, the third end 33 is deformed with an end of first protrusion 37 serving as a pivot, and the fourth end 34 is deformed with an end of the second protrusion 38 serving as a pivot. That is, the lid member 13 has releasing portions, which are deformed away from the opening edge 14 to release gas from the sealed case 11 when the internal pressure of the sealed case 11 increases. The releasing portions are an area on the lid member 13 between the first protrusion 37 and the third end 33 and an area on the lid member 13 between the second protrusion 38 and the fourth end 34.

Hereinafter, the area between the first protrusion 37 and the third end 33 will be referred to as a first releasing portion 41, and the area between the second protrusion 38 and the fourth end 34 will be referred to as a second releasing portion 42. In this case, the first protrusion 37 of the rib 36 is located between the main body 39 and the first releasing portion 41, and the second protrusion 38 of the rib 36 is located between the main body 39 and the second releasing portion 42. In other words, the first protrusion 37 constitutes a part of the joint portion 35 that is close to the first releasing portion 41, and the second protrusion 38 constitutes a part of the joint portion 35 that is close to the second releasing portion 42.

Figure 3:
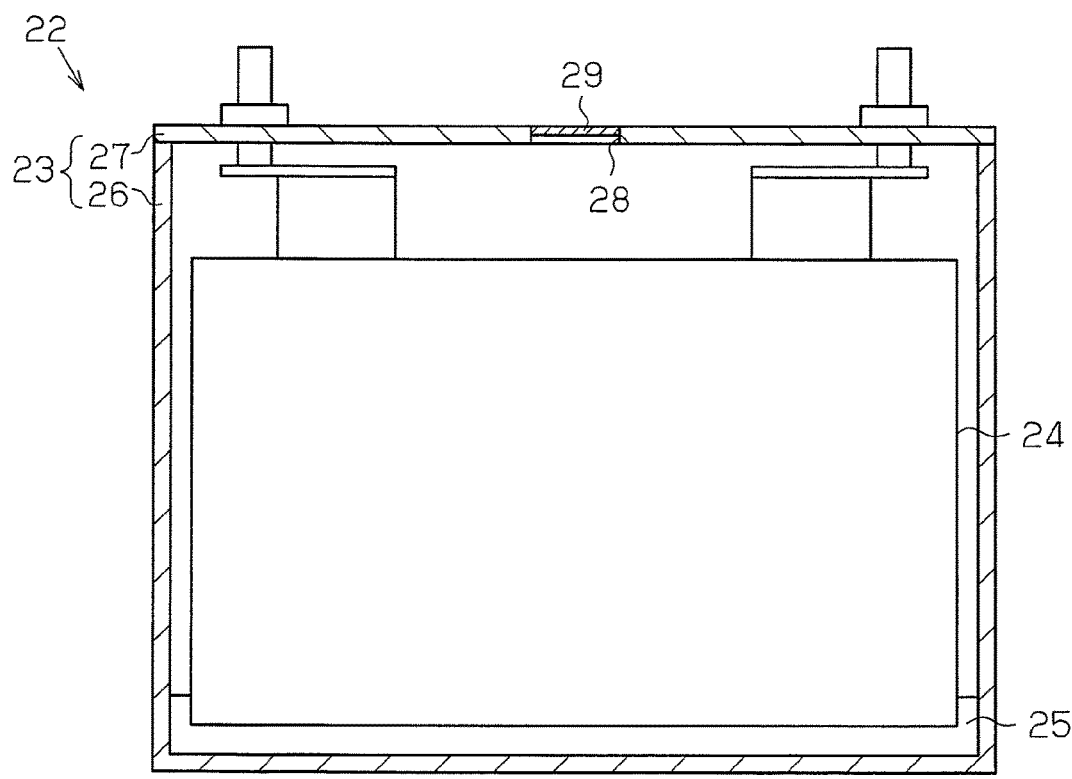
FIG. 3 is a cross-sectional view showing a battery cell.

The battery cell 22 may be, for example, a lithium-ion rechargeable battery or a nickel-metal hydride battery. As shown in FIG. 3, the battery cell 22 includes a battery case 23, an electrode assembly 24 accommodated in the battery case 23, and electrolytic solution 25. The battery case 23 includes a rectangular box-shaped case main body 26 and a rectangular plate-shaped lid 27. The case main body 26 accommodates the electrode assembly 24 and the lid 27 closes the opening of the case main body 26. The lid 27 has a hole 28, which extends through the lid 27 in the thickness direction. A valve 29 is provided in the hole 28. The valve 29 is opened when the internal pressure of the battery case 23 exceeds a specified pressure. In this case, the specified pressure is set such that, when the internal pressure of the battery case 23 increases, the valve 29 is broken before the battery case 23 is broken.

Operation of the above-described battery back 10 will now be described.

When there is an abnormality in any of the battery cells 22, gas is generated in the battery case 23 and the internal pressure of the battery case 23 increases. When the internal pressure of the battery case 23 exceeds the specified pressure, the valve 29 of the battery case 23 is broken. Accordingly, the gas in the battery case 23, for example, hydrogen, is discharged to the inside of the sealed case 11, which increases the internal pressure of the sealed case 11.

The first end 31 and the second end 32 are joined to the opening edge 14 with the bolts B. In contrast, the third end 33 and the fourth end 34 are merely pressed against the main body 12 by the urging force of the bolts B at the first end 31 and the second end 32. Thus, when the internal pressure of the sealed case 11 increases, the first releasing portion 41 and the second releasing portion 42 start being deformed away from the main body 12.

Figure 4:
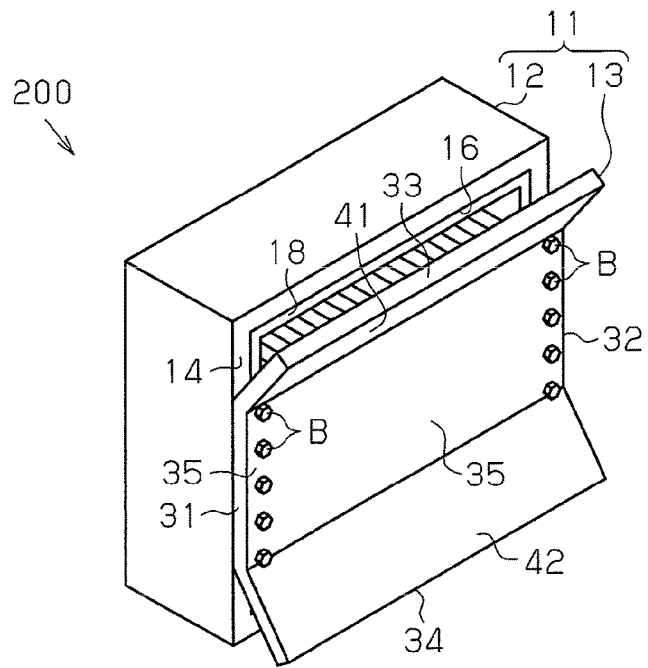
FIG. 4 is a perspective view showing a battery pack of a comparison example.

FIG. 4 shows a battery pack 200 that does not have a rib 36 on the lid member 13. In this case, when the first releasing portion 41 and the second releasing portion 42 are deformed away from the main body 12, the lid member 13 is deformed with some of the bolts B serving as the pivots. Thus, the load is likely to concentrate on those bolts B.

Figure 5A:
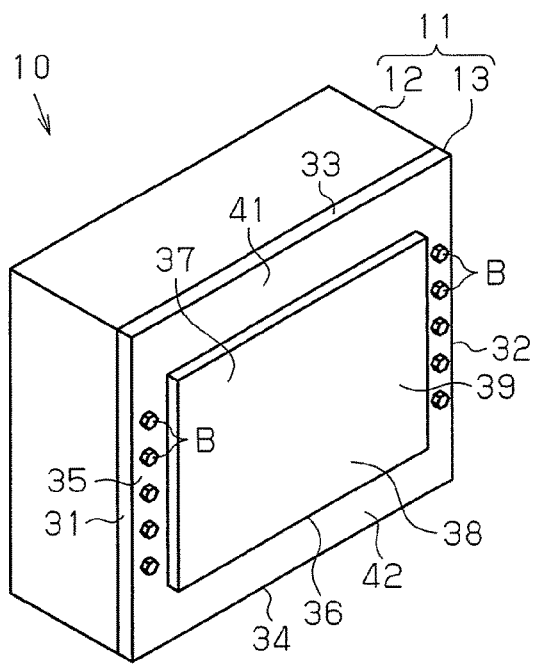
FIG. 5A is a perspective view showing a battery pack in a state before the lid member is deformed.
Figure 5B:
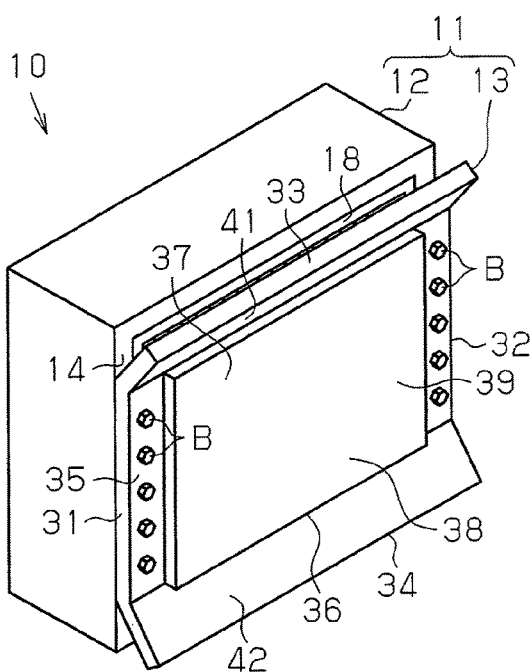
FIG. 5B is a perspective view showing the battery pack in a state after the lid member is deformed.
Figure 7:
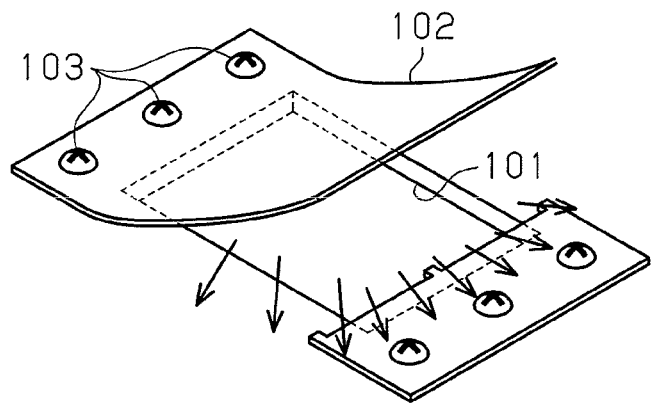
FIG. 7 is a perspective view showing a prior art.

FIGS. 5A and 5B show a case in which the lid member 13 has a rib 36. In this case, when the first releasing portion 41 and the second releasing portion 42 are deformed, the lid member 13 is deformed with the ends of the first protrusion 37 and the second protrusion 38 serving as pivots. That is, the lid member 13 is deformed along the boundary line at the end of the first protrusion 37 and along the boundary line at the end of the second protrusion 38. Accordingly, the deformation of the lid member 13 is unlikely to reach the bolts B.

When the first releasing portion 41 and the second releasing portion 42 are deformed in the above-described manner, a clearance is formed between the main body 12 and each of the first releasing portion 41 and the second releasing portion 42. Since gas is discharged from the sealed case 11 through the clearances, the internal pressure of the sealed case 11 is released. Thus, the lid member 13 is allowed to function as a valve body by partly varying the joint strength of the lid member 13 to the opening edge 14 of the main body 12. The lid member 13 is joined to the opening edge 14 of the main body 12 with the bolts B. When the first releasing portion 41 and the second releasing portion 42 are deformed and the gas starts being discharged from the sealed case 11, the joint between the main body 12 and the opening edge 14 is maintained.

Also, the original shapes of the first releasing portion 41 and the second releasing portion 42 are restored by the elastic force of the lid member 13. In reality, the amount of deformation of the lid member 13 is small. However, for purposes of illustration, the deformation of the lid member 13 is exaggerated in FIGS. 4 and 5B.

The present embodiment provides the following advantages.

(1) The lid member 13 has the rib 36, and the rib 36 has a portion arranged between the joint portion 35 and the second releasing portion 42 and a portion arranged between the joint portion 35 and the first releasing portion 41. The lid member 13 is deformed with the end of first protrusion 37 closer to the third end 33 serving as a pivot and with the end of the second protrusion 38 closer to the fourth end 34 serving as a pivot. Accordingly, the deformation of the lid member 13 is unlikely to reach the bolts B. Thus, even if the internal pressure of the sealed case 11 increases, the bolts B are unlikely to come off the main body 12, and thus the lid member 13 is unlikely to come off the main body 12. This prevents other components from being damaged by coming off of the lid member 13.

(2) Since stress is unlikely to concentrate on the bolts B, the bolts B are restrained from being damaged. This allows the bolts B to be used repeatedly.

(3) Since stress is unlikely to concentrate on the bolts B, the external threads of the bolts B and the internal threads of the threaded holes 15 are unlikely to be stripped. Thus, the main body 12 of the sealed case 11 can be used repeatedly if the battery cell 22 or the battery module 21 with an abnormality is replaced.

The above illustrated embodiment may be modified as follows.

As shown in FIG. 6A, the lid member 13 may have bolts B on only one of the four ends 31 to 34. FIG. 6A shows a lid member 13 that has bolts B only at the third end 33. A rib 52 may be provided between the bolts B and the fourth end 34. In this case, an area on the lid member 13 between the fourth end 34 and the part of the rib 52 closest to the fourth end 34 serves as a releasing portion 51. An area between the third end 33 and an imaginary line L3, which connects parts of the bolts B closest to the fourth end 34, serves as a joint portion 35. The lid member 13 is deformed with a part of the rib 52 closest to the releasing portion 51 serving as a pivot.

In the above illustrated embodiment, parts of the rib 36 are protruded to form a reinforcing portion between the joint portion 35 and each of the first releasing portion 41 and the second releasing portion 42. However, as shown in FIG. 6B, a rib 61 may be entirely provided between the joint portion 35 and each of the first releasing portion 41 and the second releasing portion 42.

As shown in FIG. 6C, vertically extending ribs 71 may be provided on the lid member 13. In this case, the first releasing portion 41 is deformed with ends of first protrusion 72 serving as a pivot. The first protrusions 72 are ends of the ribs 71 on the lid member 13 that are close to the first releasing portion 41. The second releasing portion 42 is deformed with ends of second protrusion 73 serving as a pivot. The second protrusions 73 are ends of the ribs 71 on the lid member 13 that are close to the second releasing portion 42. Thus, in this case, the area between the third end 33 and a fourth imaginary line L4, which connects parts of the ribs 71 closest to the third end 33, serves as the first releasing portion 41. Also, the area between the fourth end 34 and a fifth imaginary line L5, which connects parts of the ribs 71 closest to the fourth end 34, serves as the second releasing portion 42.

As shown in FIG. 6D, ribs 81 may be provided between the third end 33 and the fourth end 34 in the lid member 13. One of the ribs 81 extends along the bolts B in the vicinity of the third end 33, and the other rib 81 extends along the bolts B in the vicinity of the fourth end 34. In this case, the area between the part of the rib 81 in the vicinity of the third end 33 that is closest to the fourth end 34 and the part of the rib 81 in the vicinity of the fourth end 34 that is closest to the third end 33 serves as a releasing portion 83. A joint portion 35 is an area between the third end 33 and a sixth imaginary line L6, which connects parts of the bolts B in the vicinity of the third end 33 that are closest to the fourth end 34. Another joint portion 35 is an area between the fourth end 34 and a seventh imaginary line L7, which connects parts of the bolts B in the vicinity of the fourth end 34 that are closest to the third end 33.

As shown in FIG. 6E, bolts B may be provided along the third end 33 and the fourth end 34 of the lid member 13, and a bolt B may be provided at the first end 31 on the side corresponding to each of the third end 33 and the fourth end 34. Also, a bolt B may be provided at the second end 32 on the side corresponding to each of the third end 33 and the fourth end 34. In this case, a first rib 91 is provided that extends along first bolts B, which are arranged at the first end 31 and the second end 32 and on the side corresponding to the third end 33, and a second rib 91 is provided that extends along second bolts B, which are arranged at the first end 31 and the second end 32 and on the side corresponding to the fourth end 34. In this case, the area between the part of the first rib 91 closest to the fourth end 34 and the part of the second rib 91 closest to the third end 33 serves as a releasing portion 92. The area between the third end 33 and an eighth imaginary line L8, which connects parts of the two first bolts B closest to the fourth end 34, serves as a joint portion 35. Further, the area between the fourth end 34 and a ninth imaginary line L9, which connects parts of the two second bolts B closest to the third end 33, serves as another joint portion 35.

In place of the bolts B, the lid member 13 and the main body 12 may be joined to each other with an adhesive. In this case, a rib 36 is provided between a releasing portion and a part of the adhesive closest to the releasing portion.

The first releasing portion 41 and the second releasing portion 42 may be joined to the main body 12 with bolts B or an adhesive as long as the joint strength to the main body 12 is weaker than the joint strength to the joint portion 35 in the lid member 13.

One of the third end 33 and the fourth end 34 of the lid member 13 may be joined to the main body 12. That is, only one releasing portion may be provided.

Instead of providing the rib 36, the part between the joint portion 35 and each of the first releasing portion 41 and the second releasing portion 42 may be reinforced by using a metal having a higher stiffness than the metal of the other parts.

The shape of the sealed case 11 and the rib 36 may be circular or polygonal.

The invention claimed is:

1. A battery pack comprising:
    a sealed case, which includes a main body having an opening defining an edge, and a lid member, which closes the opening; and
    a battery cell, which is accommodated in the sealed case, wherein
    the lid member includes
        a joint portion, which is joined to the main body with a joint member, and
        a releasing portion, wherein a joint strength of the releasing portion to the main body is smaller than a joint strength at the joint portion, and
        a reinforcing portion, which reinforces the lid member, is provided between the joint member and the releasing portion,
    wherein the lid member is elastically deformable, wherein the releasing portion is operable to elastically deform from a sealing position to a releasing position to provide a clearance along the edge between the main body and the lid member and operable to subsequently revert to the sealing position.

2. The battery pack according to claim 1, wherein the reinforcing portion includes a main body, which is arranged on a part of the joint portion, and a protrusion, which protrudes from the main body toward the releasing portion.

3. The battery pack according to claim 1, wherein the lid member is joined to the sealed case with a bolt.

4. The battery pack according to claim 1, wherein the lid member is attached to the main body with a plurality of fasteners passing through the lid member and into threaded engagement with the main body, and the reinforcing portion is attached to the lid member without attachment to the fasteners.

5. The battery pack according to claim 1, wherein the lid member has an outer perimeter, and the reinforcing portion is arranged on the lid member completely within the lid member outer perimeter.

6. The battery pack according to claim 1, wherein the lid member has an outer perimeter, wherein the reinforcing portion has an outer perimeter, and wherein the reinforcing portion outer perimeter is smaller than the lid member outer perimeter.

* * * * *